United States Patent
Viswanathan et al.

(10) Patent No.: US 12,217,023 B2
(45) Date of Patent: *Feb. 4, 2025

(54) UNIFIED DIGITAL AUTOMATION PLATFORM COMBINING BUSINESS PROCESS MANAGEMENT AND ROBOTIC PROCESS AUTOMATION

(71) Applicant: Rocket Software Technologies, Inc., Waltham, MA (US)

(72) Inventors: Narayanaswamy Viswanathan, Plano, TX (US); Sathish Kumar Thangaraj, Hyderabad (IN); Raghav Sanjeev Nyapati, Hyderabad (IN)

(73) Assignee: Rocket Software Technologies, Inc., Waltham, MA (US)

( * ) Notice: Subject to any disclaimer, the term of this patent is extended or adjusted under 35 U.S.C. 154(b) by 77 days.

This patent is subject to a terminal disclaimer.

(21) Appl. No.: 18/145,492

(22) Filed: Dec. 22, 2022

(65) Prior Publication Data

US 2023/0139208 A1 May 4, 2023

Related U.S. Application Data

(63) Continuation of application No. 17/331,871, filed on May 27, 2021, now Pat. No. 11,550,549, which is a
(Continued)

(51) Int. Cl.
*G06F 11/00* (2006.01)
*G06F 8/30* (2018.01)
(Continued)

(52) U.S. Cl.
CPC .................. *G06F 8/30* (2013.01); *G06F 8/60* (2013.01); *G06F 21/31* (2013.01); *G06Q 10/06316* (2013.01)

(58) Field of Classification Search
CPC ... G06F 8/30; G06F 8/60; G06F 21/31; G06F 16/2379; G06F 16/258; G06F 8/35;
(Continued)

(56) References Cited

U.S. PATENT DOCUMENTS 11,055,067 B2  7/2021  Thangaraj et al.
11,113,105 B1 *  9/2021  Ahmed .................. G06F 9/541
(Continued)

OTHER PUBLICATIONS

Winters, Mike, "End-To-End Workflow Automation with RPA and Camunda BPM", XP093088999, Retrieved from the Internet: <URL:https://camunda.com/blog/2018/05/combi ning-bpm-rpa-workflow-automation/>, [retrieved on Oct. 5, 2023], May 29, 2018, pp. 1-7.
(Continued)

*Primary Examiner* — Thuy Dao
(74) *Attorney, Agent, or Firm* — Danielson Legal LLC (57) ABSTRACT

Provided are methods and systems for combining business process management (BPM) and robotic process automation (RPA) into a unified BPM and RPA process. An example method commences with creating a BPM process flow. The BPM process flow can include one or more BPM models for executing BPM tasks. The method then proceeds with creating an RPA process flow. The RPA process flow can include one or more RPA models for executing the one or more RPA tasks. The method can further include linking the one or more RPA models to the BPM process flow. Thereafter, the method proceeds with creating an application package associated with the unified BPM and RPA process. The application package can include the one or more BPM models and the one or more RPA models. The method can further include exporting the application package for deployment.

20 Claims, 7 Drawing Sheets

Related U.S. Application Data continuation of application No. 16/795,575, filed on Feb. 20, 2020, now Pat. No. 11,055,067.

(60) Provisional application No. 62/923,371, filed on Oct. 18, 2019.

(51) Int. Cl.
*G06F 8/60* (2018.01)
*G06F 9/445* (2018.01)
*G06F 9/455* (2018.01)
*G06F 9/46* (2006.01)
*G06F 11/34* (2006.01)
*G06F 21/31* (2013.01)
*G06Q 10/0631* (2023.01)

(58) Field of Classification Search
CPC .. G06F 16/24522; G06F 16/353; G06F 9/547; G06Q 10/06316; G06Q 10/10; G06Q 50/186; G06Q 10/06; G06Q 10/067; G06N 20/00; G06N 5/04; G06N 5/02; G06V 30/414; G06V 30/413; H04L 41/0654; H04L 41/0803; H04L 43/0823; H04L 67/02
See application file for complete search history.

(56) References Cited

U.S. PATENT DOCUMENTS

| | | | |
|---|---|---|---|
| 11,176,443 B1 * | 11/2021 | Selva | G06F 18/25 |
| 11,550,549 B2 | 1/2023 | Thangaraj | |
| 11,763,273 B2 * | 9/2023 | Livesay | G06Q 20/389 |
| | | | 705/39 |
| 2004/0128001 A1 | 7/2004 | Levin et al. | |
| 2007/0214173 A1 * | 9/2007 | Ohashi | G06Q 10/06 |
| | | | 707/999.102 |
| 2015/0379303 A1 | 12/2015 | LaFever et al. | |
| 2016/0044380 A1 | 2/2016 | Barrett | |
| 2017/0180284 A1 | 6/2017 | Smullen et al. | |
| 2018/0322396 A1 | 11/2018 | Ahuja-Cogny et al. | |
| 2020/0026735 A1 | 1/2020 | Przada | |
| 2020/0050983 A1 | 2/2020 | Balasubramanian et al. | |
| 2020/0134374 A1 | 4/2020 | Oros | |
| 2020/0159855 A1 * | 5/2020 | Iyer | G06F 16/24522 |
| 2021/0019574 A1 | 1/2021 | Voicu | |
| 2021/0117162 A1 | 4/2021 | Thangaraj et al. | |
| 2021/0286597 A1 | 9/2021 | Thangaraj et al. | |

OTHER PUBLICATIONS

Anonymous: "Introduction", Excerpt from the documentation for Camunda BPM, version 7.11, XP93089195, Retrieved from the Internet: <URL:https://docs.camunda.org/manual/7.11/introduction/>, [retrieved on Oct. 5, 2023] May 22, 2019, pp. 1-44.
Anonymous: "Get started with Camunda", XP93089196, Retrieved from the Internet: <URL:https://web.archive.org/web/20190530231242/https://docs.camunda.org/get-started/ quick-start/>, [retrieved on Oct. 5, 2023], May 30, 2019 , pp. 1-34.
Bourgouin et al., "Towards a Process Analysis Approach to Adopt Robotic Process Automation", IEEE, 2018, 8 pages.
Romao et al., "Robotic Process Automation: A Case Study in the Banking Industry," 2019 14th Iberian Conference on Information Systems and Technologies, Jun. 19-22, 2019, 6 pages.

* cited by examiner

UNIFIED DIGITAL AUTOMATION PLATFORM COMBINING BUSINESS PROCESS MANAGEMENT AND ROBOTIC PROCESS AUTOMATION

CROSS-REFERENCE TO RELATED APPLICATIONS

This Non-Provisional patent application is a continuation of, and claims priority benefit of U.S. patent application Ser. No. 17/331,871, filed May 27, 2021, which is a continuation of U.S. patent application Ser. No. 16/795,575, filed Feb. 20, 2020, now published U.S. Pat. No. 11,055,067, issued Jul. 6, 2021, which claims priority of U.S. Provisional Patent Application No. 62/923,371, filed on Oct. 18, 2019. All of the aforementioned disclosures are hereby incorporated by reference herein in their entireties including all references and appendices cited therein.

FIELD

This application relates generally to data and process integration and, more specifically, to systems and methods for combining business process management (BPM) and robotic process automation (RPA) into a unified process.

BACKGROUND

Automation technologies such as BPM and RPA are empowering organizations by digitizing business processes, automating workplaces, augmenting humans with digital workers, creating intelligent and self-learning products, and thereby accelerating digital transformation across enterprises. Enterprises are facing challenges of a multitude of manual processes spread across multiple siloed applications/business units, adoption challenges to rapidly changing business processes across applications, and the need to perform repetitive, monotonous, and mundane human tasks. These process inefficiencies, invisibility, lack of cohesiveness, and lack of the ability to change these processes result in duplication of work, reduction of the productivity, and waste of employee effort and time.

In conventional BPM systems, RPA capabilities are integrated inorganically, often by acquisition or by partnership. This approach can cause multiple issues. First, multiple entry points/user interfaces are needed because BPM and RPA processes have separate user interfaces for design time; therefore, a user needs to create a BPM model and an RPA model as well as a BPM process flow and an RPA process flow separately without any interconnection between the models and the flows during the design phase. Accordingly, when a user applies BPM solutions and RPA solutions provided by different BPM and RPA vendors, the user needs to use two separate user interfaces: one for the BPM platform and another for the RPA platform. In addition, the user needs to design two different process flows and use two different applications for running the BPM process flow and the RPA process flow.

Second, using conventional approaches, an external application programming interface (API)-based connection is needed because the BPM engine and the RPA engine are typically connected through either an external API or tokens, requiring an active network connection between the BPM engine and the RPA engine.

In general, BPM and RPA have similar goals and are not competing approaches. To solve above-mentioned issues, BPM product developers have been trying to streamline and bring in more agility and transparency to the BPM processes. On their side, RPA product developers have been trying to automate the repetitive, monotonous, and mundane human tasks. However, existing BPM and RPA solutions operate as pure platforms, catering only to one automation type, either process activities or human activities and, despite being complementary, these technologies have never been consolidated or built organically as a single unified product.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Provided are methods and systems for combining BPM and RPA processes into a unified BPM and RPA process. In some embodiments, a method for combining the BPM and the RPA into a unified BPM and RPA process may commence with creating a BPM process flow. The BPM process flow may include one or more BPM models for executing one or more BPM tasks. The method may continue with creating an RPA process flow. The RPA process flow may include one or more RPA models for executing one or more RPA tasks. The method may further include linking the one or more RPA models to the BPM process flow. The method may then continue with creating an application package associated with the unified BPM and RPA process. The application package may include the one or more BPM models and the one or more RPA models. The application package may then be exported for deployment in a runtime environment.

In some example embodiments, a system for combining BPM and RPA into a unified BPM and RPA process may include an application server, a BPM process modeler, and an RPA process modeler. A user may use the BPM process modeler to create a BPM process flow. The BPM process flow may include one or more BPM models for executing one or more BPM tasks. The user may use the RPA process modeler to create an RPA process flow. The RPA process flow may include one or more RPA models for executing one or more RPA tasks. The one or more RPA models may be linked to the BPM process flow. Upon linking the one or more RPA models to the BPM process flow, an application package associated with the unified BPM and RPA process can be created. The application package may include the one or more BPM models and the one or more RPA models. The application package may be exported for deployment in a runtime environment.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Exemplary embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, and other embodiments can be formed, by introducing structural and logical changes without departing from the scope of what is claimed. The following detailed description is, therefore, not to be taken in a limiting sense and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The present disclosure relates to systems and methods for combining BPM and RPA that enable automation of human activities and business processes with a single intuitive user interface (i.e., enable the BPM process and RPA process to be executed together). The present disclosure provides a single design studio for both BPM and RPA such that the users are able to create BPM models as well as RPA models, which can be integrated seamlessly, thereby providing a unified automation capability for the users across organizations.

The system for combining BPM and RPA enables implementing both BPM and RPA processes together in order to enhance process automation and bring more value than when one tool is leveraged alone. The system provides an organic approach to building a digital automation solution, enabling customers to design, publish, and execute both BPM and RPA tasks and in which BPM process flows and RPA process flows can be designed and executed using the same platform. The system also provides a single design desk to define both types of automation and provide a uniquely valuable means to connect the BPM and the RPA for higher productivity of processes. Furthermore, using functionalities of two separate BPM and RPA processes, two specialists (e.g., a business analyst for the BPM and a software developer for the RPA) or two separate BPM and RPA applications can be replaced with a unified BPM and RPA process.

The method for combining BPM and RPA into a unified BPM and RPA process may commence with creating a BPM process flow. The BPM process flow can include one or more BPM models for executing BPM tasks. The method may then continue with creating an RPA process flow. The RPA process flow may include one or more RPA models for executing one or more RPA tasks. The method may further include linking the one or more RPA models to the BPM process flow. Thereafter, the method can continue with creating an application package associated with the unified BPM and RPA process. The application package may include the one or more BPM models and the one or more RPA models. The application package may be then exported for deployment in a runtime environment.

Thus, according to the present disclosure, merging the BPM and the RPA is a seamless process. Specifically, an RPA task can be invoked within the BPM process to perform automation by a bot. Once the bot finishes the automation task within the RPA platform, the bot can send results of the execution of the automation task back to the BPM platform to resume the process, thereby creating a high value end-to-end automation. Moreover, even though the RPA is traditionally focused on technical specialists (e.g., software developers) and the BPM is traditionally focused on business specialists (e.g., business analysts), the system of the present disclosure may help business specialists to be in control of the RPA as well as BMP processes. Thus, the system is, essentially, a BPM plus RPA solution that enables automation of human activities and business processes within a single intuitive user interface.

Figure 1:
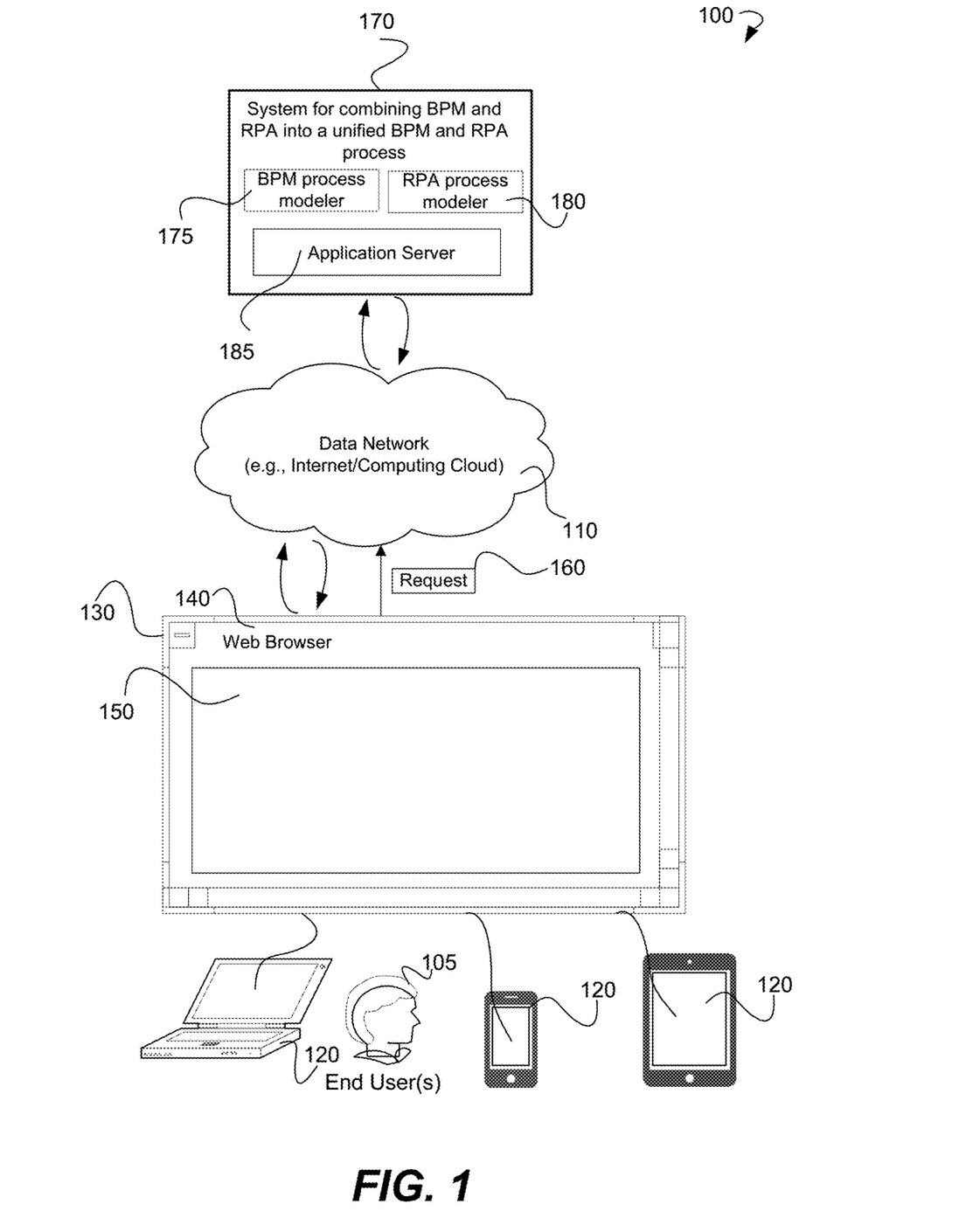
FIG. 1 illustrates an environment within which methods and systems for combining BPM and RPA into a unified BPM and RPA process can be implemented, according to an example embodiment.

Referring now to the drawings, FIG. 1 illustrates an environment 100 within which systems and methods for combining BPM and RPA into a unified BPM and RPA process can be implemented. The environment 100 may include a data network 110 (e.g., an Internet or a computing cloud), end user(s) 105, client device(s) 120 associated with the end user 105, and a system 170 for combining BPM and RPA into a unified BPM and RPA process. In some embodiments, end user(s) 105 may include Information Technology (IT) developers who build and create software applications and are proficient in one or more coding languages, members of a customer team who may not be as technologically savvy as an IT developer, and business analysts who possess the knowledge of their application but, typically, are not very technical. Client device(s) 120 may include a personal computer (PC), a desktop computer, a laptop, a smartphone, a tablet, or so forth.

The system 170 may include a BPM process modeler 175, an RPA process modeler 180, and an application server 185. The client device 120 may include a user interface 130. Furthermore, a web browser 140 may be running on the client device 120 and rendered using the user interface 130. The web browser 140 may communicate with the application server 185 via the data network 110.

The data network 110 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

The web browser 140 may display a web page associated with a studio 150 where end user(s) 105 can build applications using different products. The web browser 140 may establish a communication channel with the application server 185 and generate and render virtual screens based on data received from the application server 185.

The end user 105 can send a request 160 to the system 170 using the client device 120. The request 160 may include a request to deploy a component to an application package. The component may be a BPM task and/or an RPA task. In response to the request 160, the application server 185 may load the component into the application package. The application package and the component may be rendered by the web browser 140.

Figure 2:
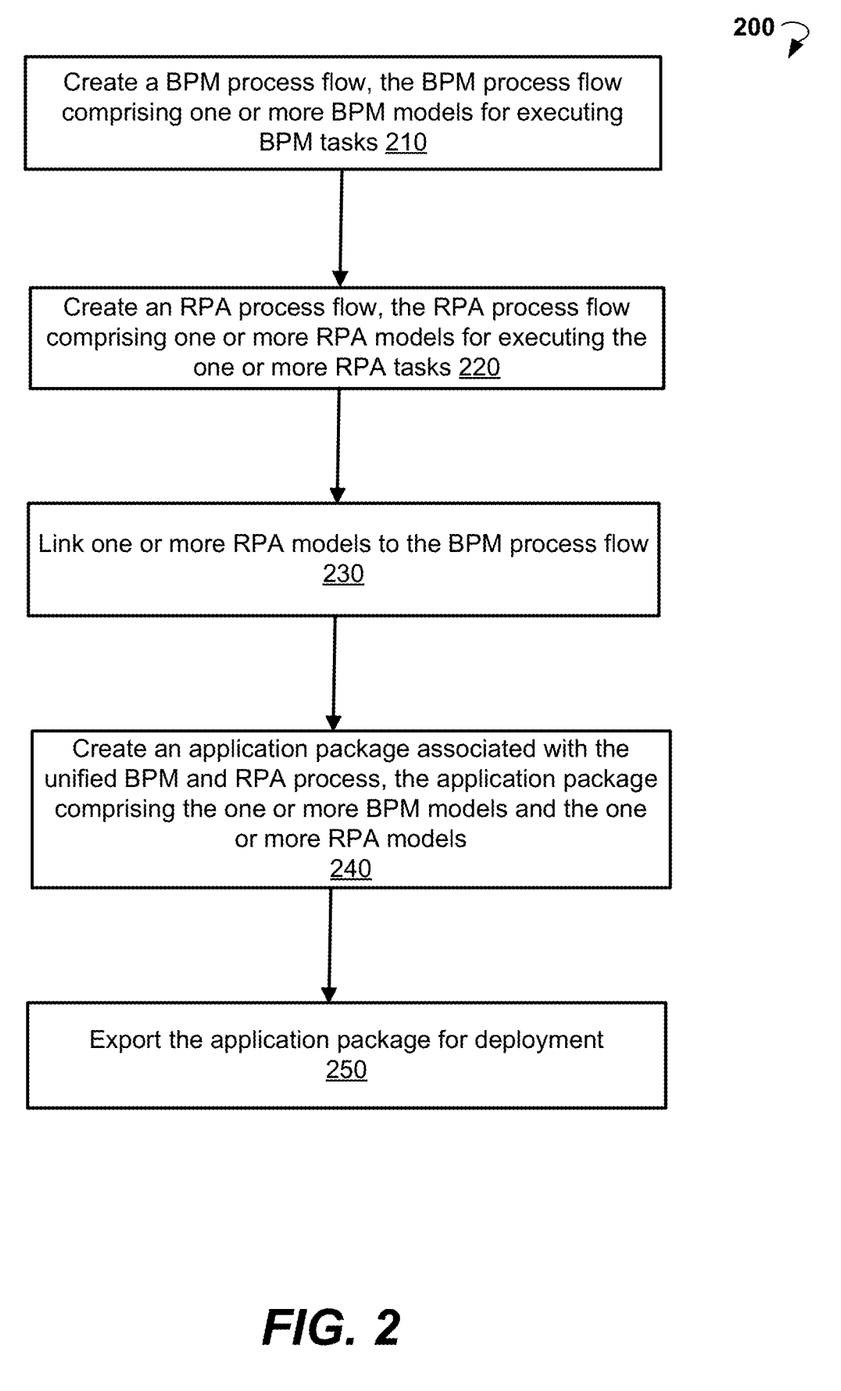
FIG. 2 is a flow diagram illustrating a method for combining BPM and RPA into a unified BPM and RPA process, according to an example embodiment.

FIG. 2 shows a process flow diagram of a method 200 for combining BPM and RPA into a unified BPM and RPA process, according to an example embodiment. In some embodiments, the operations may be combined, performed in parallel, or performed in a different order. The method 200 may also include additional or fewer operations than those illustrated. The method 200 may be performed by processing logic that comprises hardware (e.g., decision making logic, dedicated logic, programmable logic, and microcode), software (such as software run on a general-purpose computer system or a dedicated machine), or a combination of both.

The method 200 may commence with creating a BPM process flow via a BPM process modeler at operation 210. One or more BPM models for executing BPM tasks may be added to the BPM process flow. The method 200 may further include creating an RPA process flow via an RPA process modeler and adding one or more RPA models for executing one or more RPA tasks to the RPA process flow at operation 220. Both the BPM process flow and the RPA process flow may be visualized to a user via a single user interface. The method 200 may further include receiving, from the user, a selection of the one or more RPA tasks. The one or more RPA tasks may be added to the BPM process flow.

The method 200 may further include linking one or more RPA models to the BPM process flow via the BPM process modeler at operation 230. In an example embodiment, the linking of the one or more RPA models with the BPM process flow may include adding the one or more RPA tasks to the BPM process flow.

The method 200 may then continue with creating an application package associated with the unified BPM and RPA process via an application server at operation 240. The application package may include the one or more BPM models and the one or more RPA models. The application package may be exported for deployment in a runtime environment via the application server at operation 250.

The method 200 may further include executing the application package. The execution of the application package may start with executing the one or more BPM tasks by a BPM process engine. The BPM process engine may execute the one or more BPM tasks based on the one or more BPM models according to the BPM process flow. When the BPM process engine determines that the next task in the BPM process flow is an RPA task associated with the one or more RPA models, the execution of the application package may continue with triggering, by the BPM process engine, a call to an RPA process engine to instruct the RPA process engine to execute the one or more RPA tasks. The BPM process engine may be associated with a BPM processing environment and the RPA process engine may be associated with an RPA processing environment.

Based on the call, the RPA process engine may execute the one or more RPA tasks based on the one or more RPA models to obtain an RPA output. The RPA output may be provided to the BPM process engine. The BPM process engine consumes the RPA output as an input and continues performing one or more further BPM tasks based on the BPM process flow. When the BPM process engine identifies further RPA tasks associated with the one or more RPA models in the BPM process flow, the BPM process engine performs further calls to the RPA process engine to instruct the RPA process engine to execute one or more further RPA tasks. Therefore, the unified BPM and RPA process runs smoothly because the information exchange between the BPM processing environment and the RPA processing environment is seamless. Furthermore, there is no breakage or leakage of any information or data in between the BPM processing environment and the RPA processing environment.

In an example embodiment, the execution of the one or more RPA tasks by the RPA process engine may include providing a command to execute the one or more RPA tasks to a bot node. The bot node may execute the one or more RPA tasks based on the one or more RPA models to obtain the RPA output.

In an example embodiment, the method 200 may further include receiving user credentials from the user. Based on the user credentials, the user may be authenticated both in the BPM processing environment and the RPA processing environment. The user may access both the BPM processing environment and the RPA processing environment via the single user interface. Policies, rules, authorization data, and authentication data may be stored in a single place, such as in any of the BPM processing environment and the RPA processing environment, and seamlessly passed between the BPM processing environment and the RPA processing environment.

The system 170 shown in FIG. 1 and the method 200 shown in FIG. 2 provide a competitive advantage for customers by combining the power of BPM that streamlines the processes across various applications and business units within an organization with RPA that automates the highly repetitive, routine, and mundane tasks to provide an end-to-end process automation platform for various digital transformation initiatives across organizations. With the unified automation platform, the digital workforce of RPA bots can be invoked at various points of the overall business process to eliminate repetitive work performed by numerous people. The result may include an automated process, a single end-to-end process flow, increased visibility and agility to overall business processes, reduction in human error and costs, reduction in the cost of development and implementation of the unified automation platform, and so forth. Moreover, because automation-related processes, such as auditing, debugging, and logging, as well as the whole end-to-end flow, can be now visible to a business analyst, the business analyst can have a continuous view of how the whole BPM and RPA processes are running. As a result, a business analyst would not need to refer to multiple systems for review of the logs and observation of the state of BPM and RPA processes. The business analyst may review an audit trail of both the BPM process and the RPA process simultaneously and may perform necessary actions, such as debugging, if needed. Furthermore, by using the unified BPM and RPA process, the processes developed by a company may be published as soon as possible, as well as dependencies between company departments that develop different portions of the unified BPM and RPA process can be streamlined.

Additionally, the system 170 provides a simplification of the authentication authorization as a user has to log into only one system (i.e., the system 170) and use only one authentication authorization mechanism (as opposed to logging into two different systems/applications) to manage both BPM and RPA. Additionally, information concerning authentication, authorization, or any related policies that control how the BPM and RPA have to be accessed may be saved in a single environment and seamlessly passed between BPM and RPA environments. Storing the authentication, authorization, and policy-related information in a single storage may also help to reduce costs.

Figure 3:
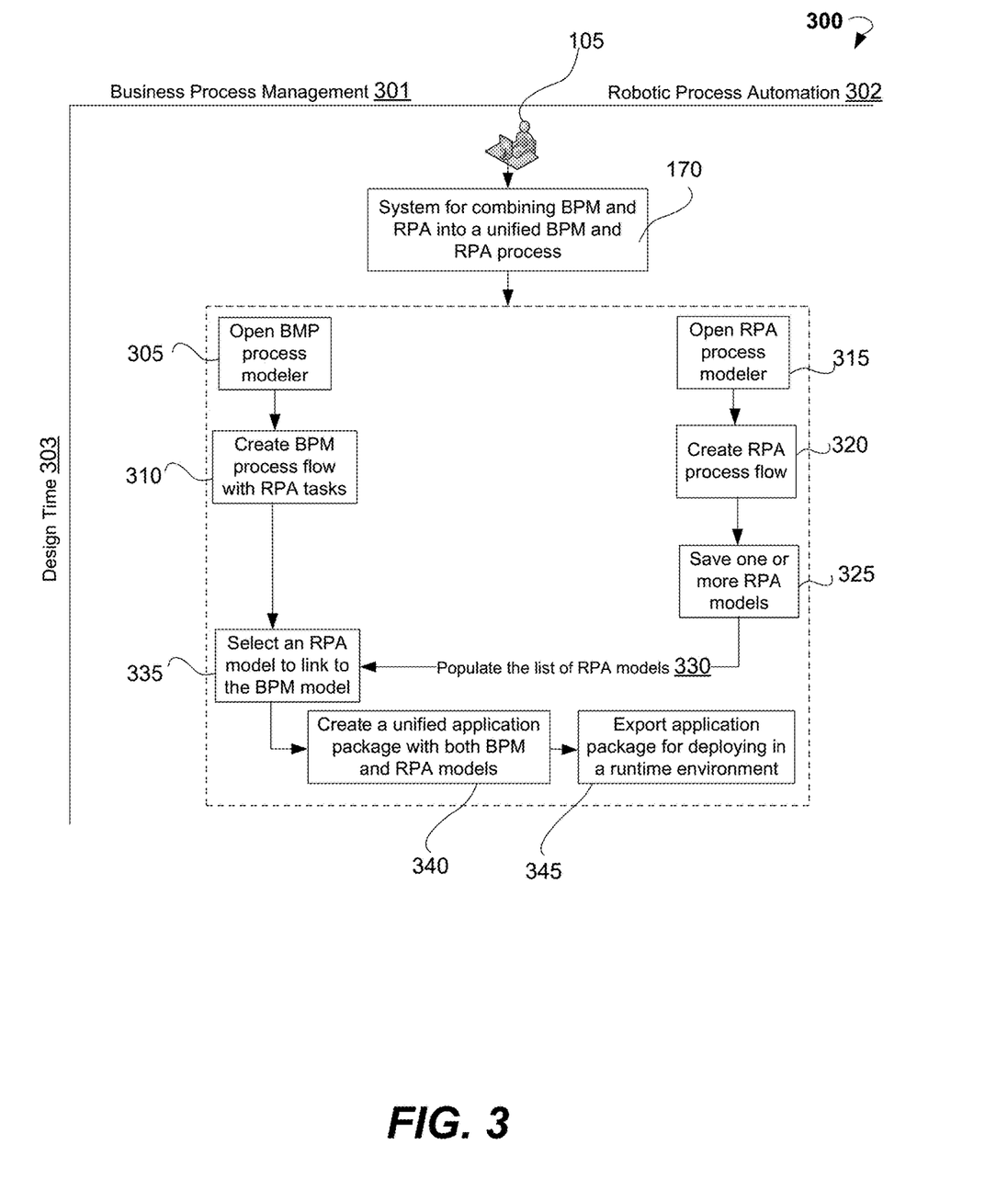
FIG. 3 is a schematic diagram showing a BPM and RPA process model, according to an example embodiment.

FIG. 3 is a schematic diagram showing a BPM and RPA process model 300, according to an example embodiment. The BPM and RPA process model 300 shows steps of BPM 301 and RPA 302 and design time 303. At block 305, an end user 105 may open a BPM process modeler associated with the system 170. The end user 105 may include a business analyst or an application developer working on the design of the RPA process within the BPM process flow. At block 310, the end user 105 may create a BPM process flow. The user may add one or more RPA tasks to the BPM process flow. In an example embodiment, RPA tasks may be pre-modeled so that the user may select the one or more RPA tasks from a list of RPA tasks. In a further example embodiment, the user may create the one or more RPA tasks. At block 315, the end user 105 may open an RPA process modeler associated with the system 170. The end user 105 may then create an RPA process flow at block 320. The RPA process flow may have one or more RPA models for executing the one or more RPA tasks. At block 325, the one or more RPA models may be saved. A list of RPA models may be populated into the BPM process flow at block 330. Thereafter, at block 335, the one or more RPA models may be linked to a BPM model associated with the BPM process flow. The one or more RPA models may be used for execution of the one or more RPA tasks. At block 340, a unified application package containing both BPM models and RPA models can be created. At block 345, the application package may be exported for deployment in a runtime environment. Therefore, both RPA tasks and BPM tasks may be executed by running a single application package.

Figure 4:
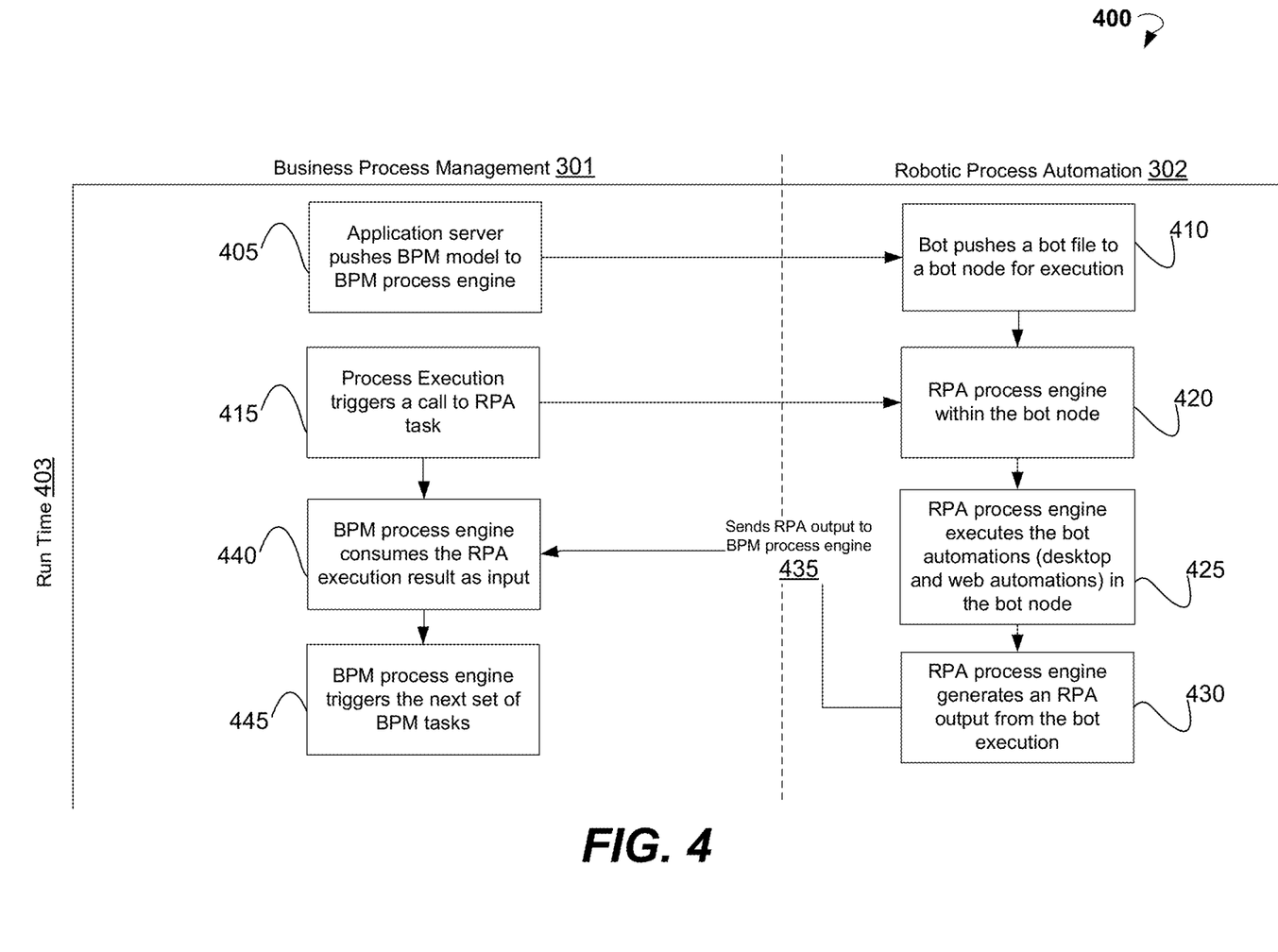
FIG. 4 is a flow chart illustrating execution of a unified BPM and RPA process, according to an example embodiment.

FIG. 4 is a flow chart illustrating execution of the unified BPM and RPA process 400, according to an example embodiment. The unified BPM and RPA process 400 shows steps of BPM 301 and RPA 302 performed during run time 403. The unified BPM and RPA process 400 can be executed by a BPM process engine associated with the BPM 301 and an RPA process engine associated with an RPA 302. At block 405, the application server can use the runtime environment to push a BPM model to the BPM process engine. At block 410, an automated task (also referred herein to as a bot) associated with the RPA 302 pushes a bot file to a bot node for execution. At block 415, the execution of the process in the BPM 301 triggers a call to an RPA task. At block 420, the RPA process engine is initiated within the bot node. At block 425, the RPA process engine executes a bot automation (desktop or web automations) in the bot node. At block 430, the RPA process engine generates an RPA output based on the bot execution and sends the RPA output to the BPM process engine at step 435. At block 440, the BPM process engine consumes the RPA output of the task execution performed by the RPA process engine as an input. Then, at block 445, the BPM process engine triggers the next set of BPM tasks.

Thus, the RPA process flow can be seamlessly integrated into the BPM process flow. The BPM process flow can trigger the RPA process flow, so that the RPA process flow can perform corresponding tasks and send the results back to the BPM process flow. The BPM process flow can consume those results of the tasks and process the results. Thus, there is no breakage or leakage of any information or any data in between the RPA process flow and the BPM process flow.

Figure 5:
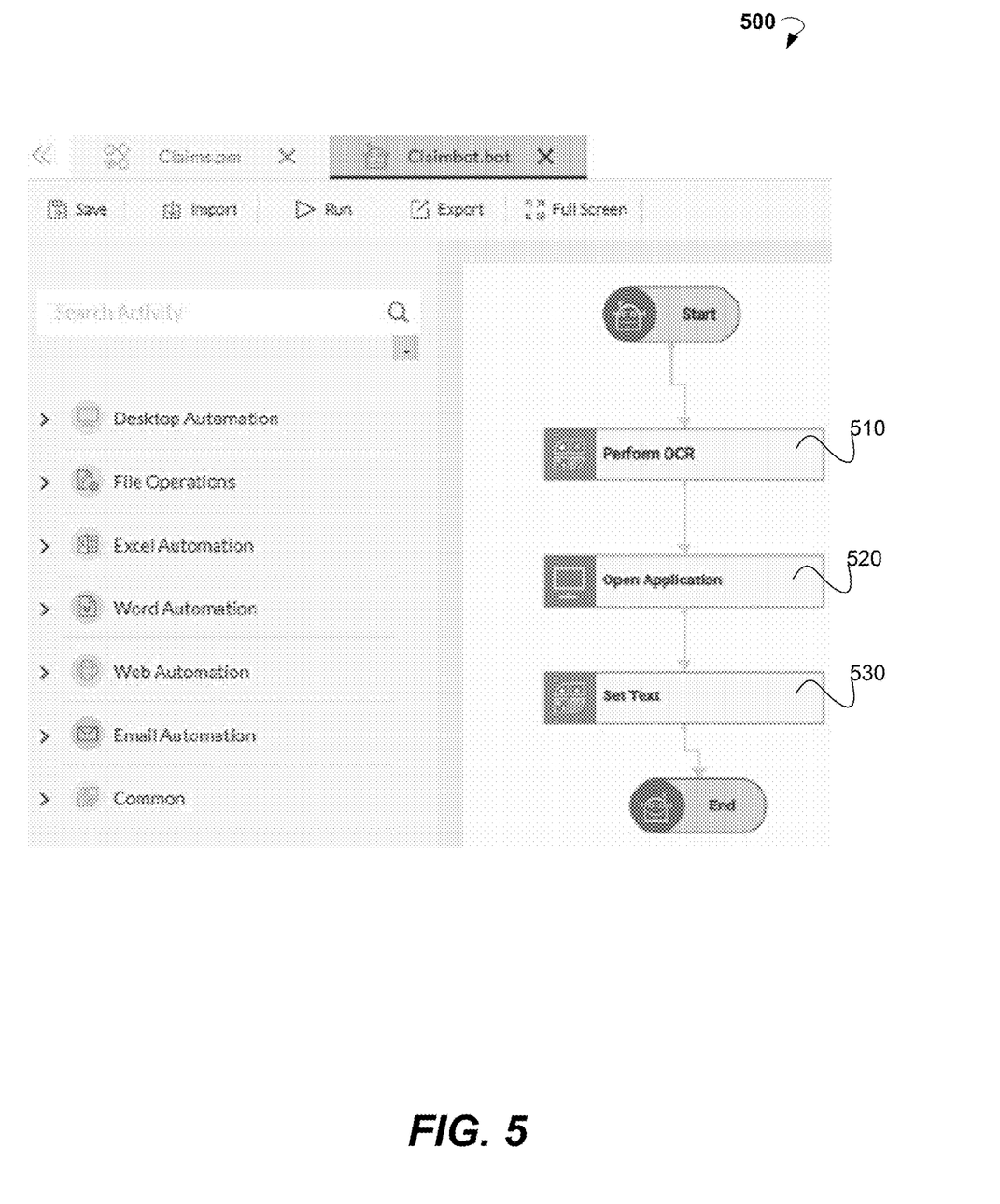
FIG. 5 shows a screenshot illustrating a task performed in an exemplary unified BPM and RPA process.

FIG. 5 shows a screenshot 500 illustrating a task of an exemplary unified BPM and RPA process. The task may include an RPA task performed by a bot node. The RPA task may include the following steps: performing optical character recognition (OCR) of text at step 510, opening an application at step 520, and setting text based on the OCR at step 530.

Figure 6:
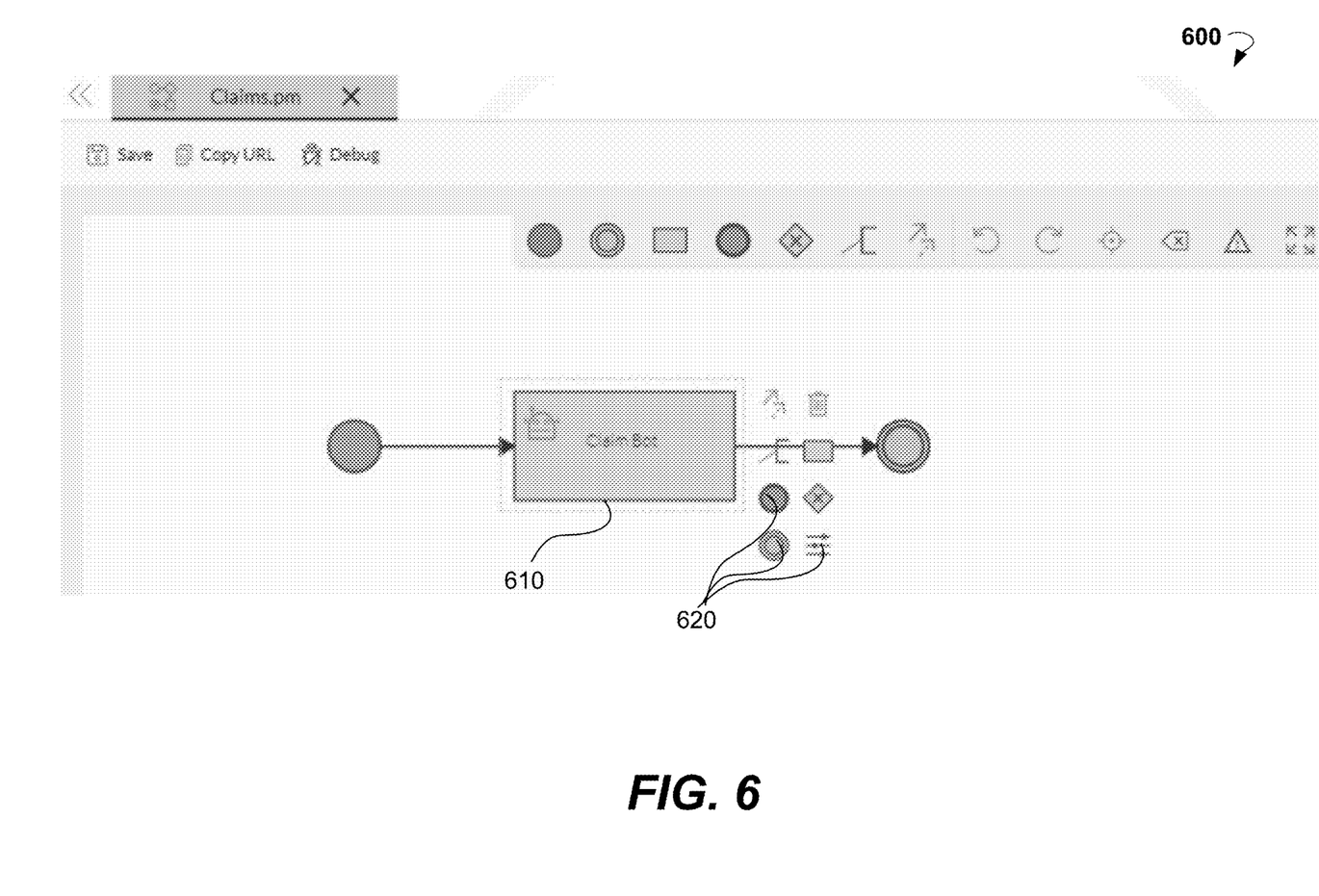
FIG. 6 shows a screenshot illustrating creating a task in an exemplary unified BPM and RPA process.

FIG. 6 shows a screenshot 600 illustrating creating a task in an exemplary unified BPM and RPA process. FIG. 6 shows a bot 610 and a set of execution steps 620 that may be added to a task for execution by the bot 610.

Figure 7:
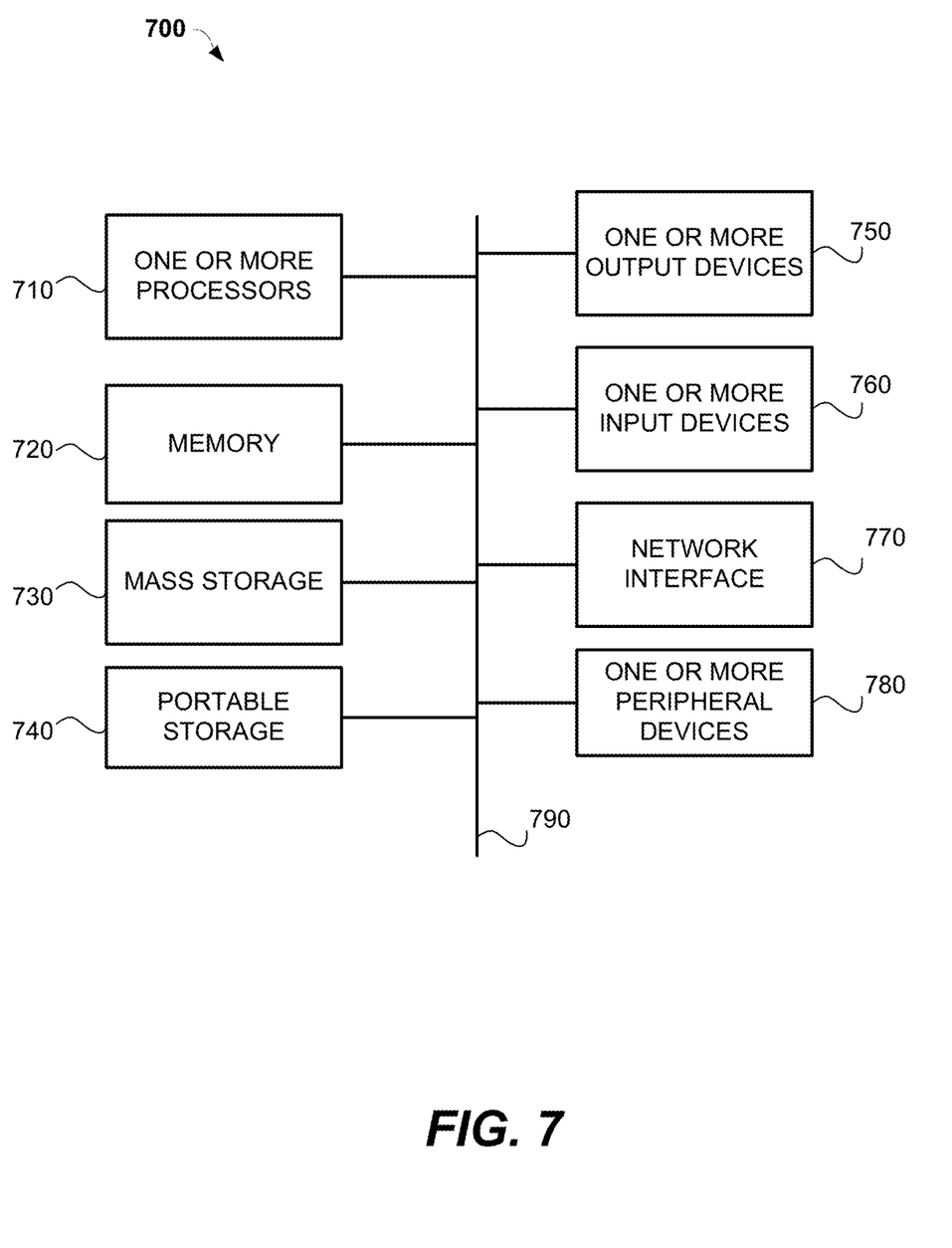
FIG. 7 is a computing system that can be used to implement a method for combining BPM and RPA into a unified BPM and RPA process, according to an example embodiment.

FIG. 7 illustrates an exemplary computing system 700 that may be used to implement embodiments described herein. The exemplary computing system 700 of FIG. 7 may include one or more processors 710 and memory 720. Memory 720 may store, in part, instructions and data for execution by the one or more processors 710. Memory 720 can store the executable code when the exemplary computing 700 is in operation. The exemplary computing system 700 of FIG. 7 may further include a mass storage 730, portable storage 740, one or more output devices 750, one or more input devices 760, a network interface 770, and one or more peripheral devices 780.

The components shown in FIG. 7 are depicted as being connected via a single bus 790. The components may be connected through one or more data transport means. The one or more processors 710 and memory 720 may be connected via a local microprocessor bus, and the mass storage 730, one or more peripheral devices 780, portable storage 740, and network interface 770 may be connected via one or more input/output buses.

Mass storage 730, which may be implemented with a magnetic disk drive or an optical disk drive, is a non-volatile storage device for storing data and instructions for use by a magnetic disk or an optical disk drive, which in turn may be used by one or more processors 710. Mass storage 730 can store the system software for implementing embodiments described herein for purposes of loading that software into memory 720.

Portable storage 740 may operate in conjunction with a portable non-volatile storage medium, such as a compact disk (CD) or digital video disc (DVD), to input and output data and code to and from the computing system 700 of FIG. 7. The system software for implementing embodiments described herein may be stored on such a portable medium and input to the computing system 700 via the portable storage 740.

One or more input devices 760 provide a portion of a user interface. The one or more input devices 760 may include an alphanumeric keypad, such as a keyboard, for inputting alphanumeric and other information, or a pointing device, such as a mouse, a trackball, a stylus, or cursor direction keys. Additionally, the computing system 700 as shown in FIG. 7 includes one or more output devices 750. Suitable one or more output devices 750 include speakers, printers, network interfaces, and monitors.

Network interface 770 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 770 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 780 may include any type of computer support device to add additional functionality to the computing system. The one or more peripheral devices 780 may include a modem or a router.

The components contained in the exemplary computing system 700 of FIG. 7 are those typically found in computing systems that may be suitable for use with embodiments described herein and are intended to represent a broad category of such computer components that are well known in the art. Thus, the exemplary computing system 700 of FIG. 7 can be a personal computer, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, various embodiments of methods and systems for combining BPM and RPA into a unified BPM and RPA process have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

What is claimed is:

1. A method for combining business process management (BPM) and robotic process automation (RPA) into a unified BPM and RPA process, the method comprising:
    receiving a BPM process flow, the BPM process flow comprising one or more BPM models for executing one or more BPM tasks;
    receiving an RPA process flow, the RPA process flow comprising one or more RPA models for executing one or more RPA tasks;
    receiving, from a user, a selection of the one or more RPA tasks;
    linking, in response to the selection, the one or more RPA models for executing the one or more RPA tasks with the BPM process flow;
    creating an application package associated with the unified BPM and RPA process, the application package comprising the one or more BPM models and the one or more RPA models; and
    exporting the application package for deployment.

2. The method of claim 1, wherein the linking the one or more RPA models with the BPM process flow includes adding the one or more RPA tasks to the BPM process flow.

3. The method of claim 1, further comprising executing the application package, wherein the executing the application package includes:
   executing the one or more BPM tasks by a BPM process engine, wherein the BPM process engine executes the one or more BPM tasks based on the one or more BPM models.

4. The method of claim 3, wherein the executing the application package further comprises:
   triggering, by the BPM process engine, a call to an RPA process engine to instruct the RPA process engine to execute the one or more RPA tasks, wherein the RPA process engine executes the one or more RPA tasks based on the one or more RPA models to obtain an RPA output; and
   providing the RPA output to the BPM process engine, wherein the BPM process engine consumes the RPA output as an input.

5. The method of claim 4, wherein the execution of the one or more RPA tasks comprises:
   providing, to a bot node, a command to execute the one or more RPA tasks; and
   executing the one or more RPA tasks by the bot node based on the one or more RPA models to obtain the RPA output.

6. The method of claim 4, wherein the BPM process engine is associated with a BPM processing environment; and
   wherein the RPA process engine is associated with an RPA processing environment.

7. The method of claim 6, wherein the BPM process flow and the RPA process flow are visualized via a single user interface.

8. The method of claim 7, further comprising:
   receiving user credentials from a user; and
   based on the user credentials, authenticating the user both in the BPM processing environment and the RPA processing environment, wherein the user accesses both the BPM processing environment and the RPA processing environment via the single user interface.

9. The method of claim 8, further comprising:
   storing at least one of policies, rules, and authentication data in any of the BPM processing environment and the RPA processing environment; and
   seamlessly passing the at least one of policies, rules, and authentication data between the BPM processing environment and the RPA processing environment.

10. A system for combining business process management (BPM) and robotic process automation (RPA) into a unified BPM and RPA process, the system comprising:
    an RPA process modeler stored in a memory configured to receive, from a user, a selection of one or more RPA tasks;
    a BPM process modeler having a hardware processor configured to:
       link, in response to the selection, one or more RPA models for executing the one or more RPA tasks with a BPM process flow; and
    an application server configured to:
       receive an application package associated with the unified BPM and RPA process, the application package comprising one or more BPM models and one or more RPA models.

11. The system of claim 10, wherein the RPA process modeler is further configured to receive an RPA process flow, the RPA process flow comprising the one or more RPA models for executing the one or more RPA tasks; and
    wherein the BPM process modeler having a hardware processor is further configured to:
       receive the BPM process flow, the BPM process flow comprising one or more BPM models for executing one or more BPM tasks.

12. The system of claim 11, wherein the linking the one or more RPA models with the BPM process flow includes adding the one or more RPA tasks to the BPM process flow.

13. The system of claim 11, wherein the application server is further configured to export the application package for deployment and execute the application package, wherein the executing the application package includes:
    executing the one or more BPM tasks by a BPM process engine, wherein the BPM process engine executes the one or more BPM tasks based on the one or more BPM models.

14. The system of claim 13, wherein the BPM process engine is further configured to:
    trigger a call to an RPA process engine to instruct the RPA process engine to execute the one or more RPA tasks, wherein the RPA process engine is further configured to:
       execute the one or more RPA tasks based on the one or more RPA models to provide an RPA output; and
       provide the RPA output to the BPM process engine, wherein the BPM process engine consumes the RPA output as an input.

15. The system of claim 14, wherein the RPA process engine executes the one or more RPA tasks by:
    providing, to a bot node, a command to execute the one or more RPA tasks; and
    executing the one or more RPA tasks by the bot node based on the one or more RPA models to obtain the RPA output.

16. The system of claim 14, wherein the BPM process engine is associated with a BPM processing environment; and
    wherein the RPA process engine is associated with an RPA processing environment.

17. The system of claim 16, wherein the BPM process flow and the RPA process flow are visualized via a single user interface.

18. The system of claim 17, wherein the application server is further configured to:
    receive user credentials from a user; and
    based on the user credentials, authenticate the user both in the BPM processing environment and the RPA processing environment, wherein the user accesses both the BPM processing environment and the RPA processing environment via the single user interface.

19. A system for combining business process management (BPM) and robotic process automation (RPA) into a unified BPM and RPA process, the system comprising:
    an RPA process modeler stored in a memory configured to receive an RPA process flow and to receive, from a user, a selection of one or more RPA tasks, the RPA process flow comprising one or more RPA models for executing the one or more RPA tasks; and
    a BPM process modeler having a hardware processor configured to:
       receive a BPM process flow, the BPM process flow comprising one or more BPM models for executing one or more BPM tasks; and link, in response to the selection, the one or more RPA models for executing the one or more RPA tasks with the BPM process flow; and an application server configured to:
receive an application package associated with the unified BPM and RPA process, the application package comprising the one or more BPM models and the one or more RPA models.

20. The system of claim 19, wherein the BPM process modeler having a hardware processor is further configured to:

receive a BPM process flow, the BPM process flow comprising one or more BPM models for executing one or more BPM tasks;

wherein the BPM process modeler having a hardware processor is further configured to:
execute the application package, wherein the executing the application package includes:
executing the one or more BPM tasks by a BPM process engine, wherein the BPM process engine executes the one or more BPM tasks based on the one or more BPM models;
triggering, by the BPM process engine, a call to an RPA process engine to instruct the RPA process engine to execute the one or more RPA tasks, wherein the RPA process engine executes the one or more RPA tasks based on the one or more RPA models to provide an RPA output; and
providing the RPA output to the BPM process engine, wherein the BPM process engine consumes the RPA output as an input.

* * * * *